United States Patent [19]

Gu

[11] Patent Number: 4,871,267

[45] Date of Patent: Oct. 3, 1989

[54] FOIL THRUST BEARING

[75] Inventor: Alston L. Gu, Rancho Palos Verdes, Calif.

[73] Assignee: Allied-Signal Inc., Morris Township, Morris County, N.J.

[21] Appl. No.: 203,384

[22] Filed: Jun. 7, 1988

[51] Int. Cl.⁴ ............................................. F16C 17/04
[52] U.S. Cl. .................................... 384/105; 384/106
[58] Field of Search ............... 384/104, 105, 106, 103

[56] References Cited

U.S. PATENT DOCUMENTS

| | | | |
|---|---|---|---|
| 4,621,930 | 11/1986 | Gu et al. | 384/105 |
| 4,624,583 | 11/1986 | Saville et al. | 384/105 |
| 4,668,106 | 5/1987 | Gu | 384/105 |
| 4,682,900 | 6/1987 | Gu | 384/105 |

Primary Examiner—Lenard A. Footland
Attorney, Agent, or Firm—David B. Abel; James W. McFarland

[57] ABSTRACT

A hydrodynamic process or gas bearing is disclosed which includes an integral thrust disk defining a plurality of foil elements, the radially outer edge of the disk being displaced from the major bearing surface to form a circumferential step having a varying height profile. The integral thrust disk may in the alternative or in addition, include a plurality of radially outwardly extending tabs to locally increase the flexural rigidity of the disk.

23 Claims, 2 Drawing Sheets

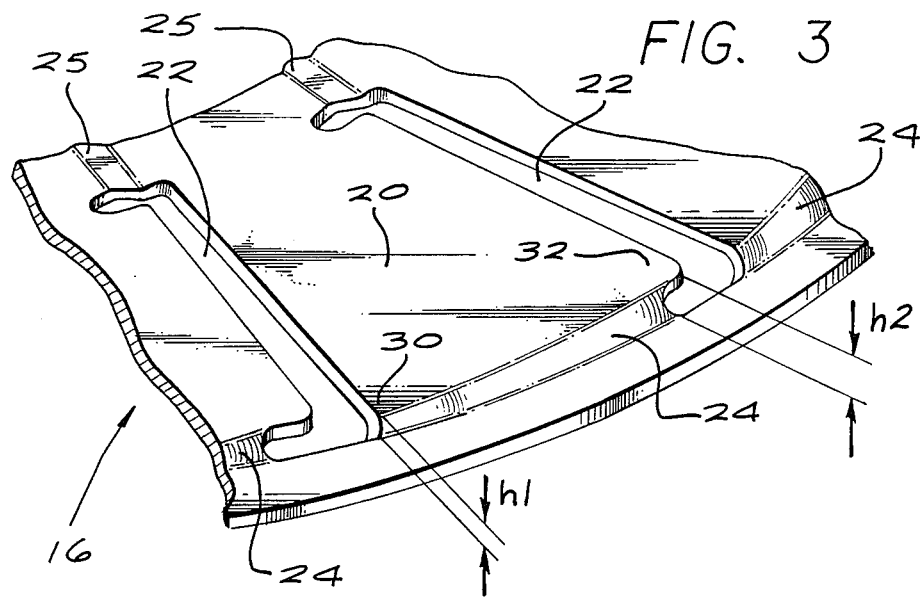
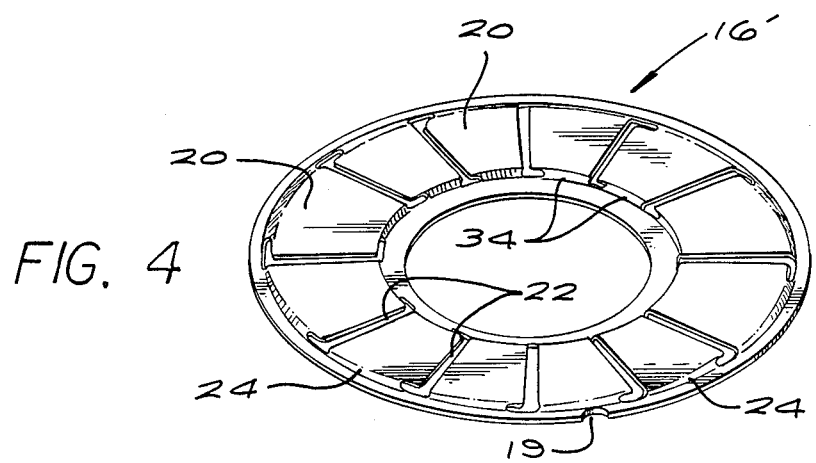
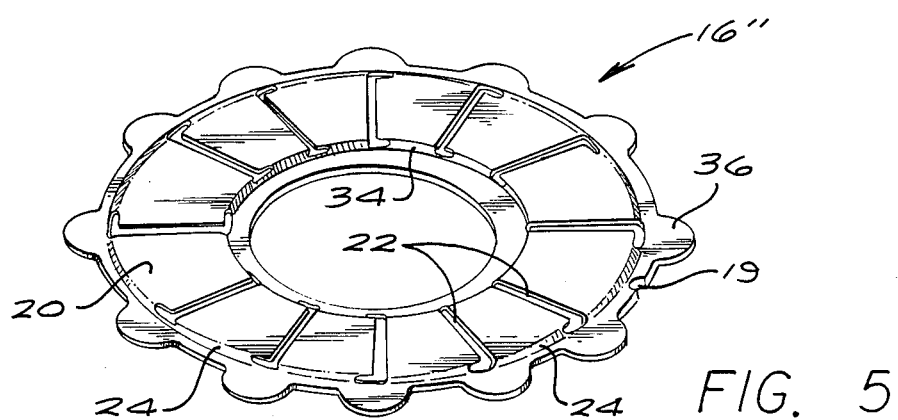

FOIL THRUST BEARING

TECHNICAL FIELD

This invention relates to the field of process fluid or gas bearings of the hydrodynamic type, and more particularly, an improved hydrodynamic foil thrust bearing having an integral thrust disk defining a plurality of foil elements which is supported by an underspring.

BACKGROUND ART

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

Improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they also introduce the requirement for an external source of clean fluid under pressure.

In order to properly position the compliant foils between the relatively movable bearing elements a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534.

More recently, a thrust bearing disk having integral compliant foil pads which eliminated the need for the plurality of individual foils which had to be individually attached to the thrust bearing disk has been developed and is exemplified in U.S. Pat. No. 4,624,583. This patent has a common inventor with the present application and is herein incorporated by reference.

Two problems associated with the thrust bearing disks of the 4,624,583 patent have been identified. First, fluttering of the individual foils under operating conditions has resulted in the leading edge of the foils moving into contact with the thrust runner, causing wear and premature failure of the thrust bearing disk. Second, since the pressure which is developed between the rotating thrust runner and stationary thrust bearing is zero at the radially outer edge of the foil elements or thrust runner, surface contact and wear occurs and gradually wears through the thrust bearing disk.

DISCLOSURE OF THE INVENTION

The present invention discloses an improved integral foil thrust bearing disk which eliminates the problems associated with the previous integral foil thrust bearing disks by the stamping of a circumferential step at the radially outer edge of the foil elements and the addition of stiffener tabs radially outward of the slots defining the trailing/leading edge of successive foil elements.

BRIEF DESCRIPTION OF THE DRAWINGS

FIG. 3 is an exploded view of a section of the thrust bearing disk of FIG. 2 indicated by section 3—3 thereof.

FIG. 4 is an enlarged perspective view of an alternate thrust bearing disk.

FIG. 5 is an enlarged perspective view of another alternate thrust bearing disk.

BEST MODE FOR CARRYING OUT THE INVENTION

Figure 1:
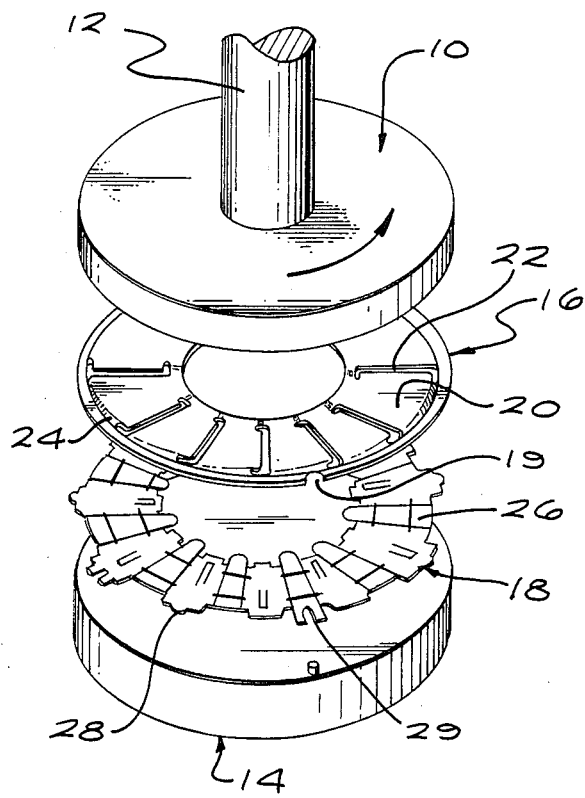
FIG. 1 is an exploded perspective view of a foil thrust bearing of the present invention.

As illustrated within FIG. 1, a thrust runner 10 including shaft 12 is rotatably supported on a thrust plate 14 by means of a process fluid thrust bearing 15. The process fluid thrust bearing 15 includes a thrust bearing disk 16 and thrust bearing underspring 18. The thrust bearing disk 16 may include indents 19 to secure the disk 16 to the thrust plate 14. The thrust bearing disk 16 has a primary bearing surface which includes a plurality of radially inwardly converging, integral bearing pads 20, separated by a plurality of slots 22 which extend generally radially. The thrust bearing disk 16 additionally has the outer edge displaced from the major bearing surface to form a circumferential step 24 at the radially outer edge of the bearing pads 20. Tee thrust bearing disk 16 may also include diverging surface ramps 25 which extend between the radially inward end of slots 22 and the inner diameter of the thrust bearing disk 16.

The thrust bearing underspring 18 includes a plurality of upper ridges 26 and lower ridges 28 alternately transversely disposed thereon to provide preload and support for the thrust disk 16. The upper ridges 26 which extend upward from the plane of the lower ridges 28 to support the plurality of bearing pads 20 may be trimmed at the radially outer edge so as to not interfere with the circumferential step 24 of the thrust bearing disk 16. The thrust bearing undersprings 18 may also include projections 29 which align with indents 19 of the thrust bearing disk 16 and which may be used to secure thrust bearing 15 against rotation.

Figure 2A:
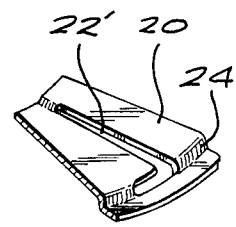
FIG. 2A shows an alternate L-shaped slot configuration for the thrust bearing disk.
Figure 2:
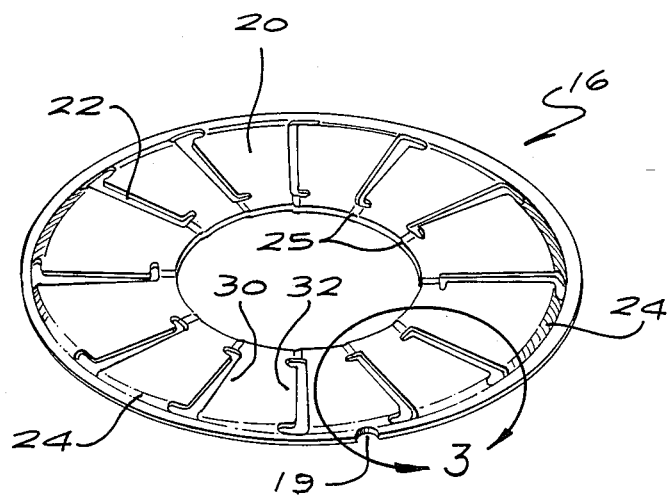
FIG. 2 is an enlarged perspective view of the thrust bearing disk of the foil thrust bearing of FIG. 1.

FIGS. 2 and 3 more clearly show the thrust bearing disk 16 as having the plurality of integral bearing pads 20 separated by slots 22, slots 22 shown as being generally U-shaped, with the base of the U being radially aligned. Alternatively, slots 22 may be generally L-shaped as shown by 22' in FIG. 2A. FIG. 3 is an exaggerated blow up showing that the height of the circumferential step 24 at the radially outer edge of the bearing pads 20 increases in the direction of rotation of the thrust runner 10 from $h_1$ at a leading edge 30 of the bearing pads 20, to $h_2$ at a trailing edge 32 of the bearing pads 20. This step height differential effectively produces a ramping of the bearing pads 20, thereby decreasing the gap between the bearing pads 20 and the thrust runner 10 at the trailing edge 32.

Additionally, the thrust runner 10 has an outer diameter which overhangs the circumferential step 24 of the thrust bearing disk 16 so that the radius at the outer edge of the bearing pads 20 effects a more gradual drop in the fluid pressure in the gap between the bearing pads 20 and the thrust runner 10, greatly reducing running contact at the outer edge of the bearing pads 20. The circumferential step 24 also tends to increase the flexural rigidity of the thrust bearing disk 16, decreasing bending at the radially outer edge of slots 22.

The thrust bearing disk 16 may be formed from any preferred disk of metal foil in a one step stamping operation wherein the slots 22 are cut out and the circumferential step 24, as well as the ramping of the bearing pads 20, are formed. Alternatively, the thrust bearing disk 16 may be formed in a two step process where the slots 22 are formed in the first step by etching or stamping, and the circumferential step 24 and bearing pad ramping is formed in the second step by a stamping operation. The height of the step formed at the leading edge 30 of the bearing pad 20, i.e. $h_1$ is in the range of from 0.001 cm to 0.025 cm while the height of the trailing edge 32, i.e. $h_2$ is in the range of from $h_1+0.002$ cm to $h_1+0.02$ cm. Preferably $h_1$ is about 0.006 cm and $h_2$ is about 0.01 cm.

FIG. 4 shows an alternate embodiment of a thrust bearing disk 16' which has the radially inward edge displaced from the major bearing surface to define an inner circumferential step 34 at the radially inward edge of bearing pads 20. This inner circumferential step 34 also increases the flexural rigidity of the thrust bearing disk 16' and prevents wear of the bearing pads 20 at their inner diameter with the thrust runner 10 which has an inner diameter less than that of bearing pads 20. The inner circumferential step 34 can be formed during the stamping operation at the same time that circumferential step 24 is formed.

FIG. 5 shows a second alternative embodiment for a thrust bearing disk 16" which includes the bearing pads 20, slots 22, and circumferential step 24 and additionally includes a plurality of tabs 36 aligned radially outward from the plurality of slots 22 in order to locally increase the flexural rigidity of the thrust bearing disk 16". The tabs 36 are preferable over simply increasing the outer diameter of the entire thrust bearing disk 16" as this would tend to make the fluid bearing 15 too stiff, adversely affecting the bearing pads 20, which need to be flexible in order to adapt to varying load conditions. It has been found that the tabs 36 also significantly reduce the leading edge wear caused by pad fluttering as well as potentially reducing the number of failures caused by fatigue cracks propagating from the outer end of slots 22 to the edge of the thrust bearing disk 16". The tabs 36 may generally extend radially from the circumference of the thrust bearing disk 16" by from 1% to 30% of the radius of the thrust bearing disk 16", and preferably extend about 15% of the radius. Tabs 36 may additionally include radially oriented outer diverging surface ramps 38, generally aligned with slots 22, to provide a height differential between the trailing edge 32 of bearing pad 20 and leading edge 30 of a succeeding bearing pad 20.

While specific embodiments of the invention have been illustrated and described, it is understood that these are provided by way of example only. Accordingly, the invention is to be construed as being limited only by the proper scope of the following claims:

I claim:

1. A fluid bearing comprising:
   a pair of members arranged for relative rotation with respect to one another, one of the said pair of members adapted to rotatably support the other; and
   a compliant foil bearing operably disposed between said pair of relatively rotatable members and mounted to one of said pair of relatively rotatable members, said compliant foil bearing including a foil thrust bearing disk, said foil thrust bearing disk having a major bearing surface including a plurality of generally radially extending slots to define therebetween radially inwardly converging integral bearing pads, said plurality of slots extending into said circumferential step and said circumferential step defines the radially outer edge of said bearing pads, said circumferential step having a first height $h_2$ at a leading edge of said bearing pads and second height $h_2$ at a trailing edge of said bearing pads and said second height is greater than said first height, therein said first height $h_1$ is in the range of from 0.0002 cm to 0.025 cm and said second height $h_2$ is equal to the quantity of $h_1$ plus from 0.0001 cm to 0.01 cm.

2. The bearing of claim 1 wherein said radially extending slots are L-shaped with the base of the L being within said circumferential step.

3. The bearing of claim 1 wherein said radially extending slots are U-shaped with the base of the U being radially aligned and the radially outer leg of the U being within said circumferential step.

4. The bearing of claim 1 wherein said thrust bearing disk further includes an inner edge displaced from said major bearing surface to define an inner circumferential step at the radially inward edge of said bearing pads.

5. The fluid bearing of claim 4 wherein said supported rotatable member has a bearing surface having an inner diameter less than the diameter to the radially inward edge of said bearing pads of said thrust bearing disk.

6. The fluid bearing of claim 1 wherein said compliant foil bearing disk is mounted to one of said pair of relatively rotatable members to secure said compliant foil bearing disk against rotation.

7. The fluid bearing of claim 1 further comprising:
   a foil stiffener disk, disposed between said foil thrust bearing and said one of said pair of relatively rotatable members to which said foil thrust bearing is mounted, said foil stiffener disk having a plurality of upper and lower ridges alternatively transversely disposed therearound, said upper ridges providing support to said integral bearing pads of said foil thrust bearing.

8. The fluid bearing of claim 1 wherein said supported rotatable member has a bearing surface having an outer diameter greater than the diameter to the radially outer edge of said bearing pads of said thrust bearing disk.

9. A fluid bearing comprising:
   a pair of members arranged for relative rotation with respect to one another, one of said pair of members adapted to rotatably support the other; and a compliant foil bearing including a compliant foil thrust bearing disk operably disposed between said pair of relatively rotatable members, said foil thrust bearing disk having a major bearing surface including a plurality of integral bearing pads separated by a plurality of generally radially extending slots, an outer edge displaced from said major bearing surface to define a circumferential step at the radially outer edge of said pads and said slots, and a plurality of tabs extending from the outer circumference of said foil thrust bearing disk and aligned radially outward from said plurality of slots to locally increase the flexural rigidity of said thrust bearing disk.

10. The compliant foil bearing of claim 9 wherein said plurality of slots extend into said circumferential step and said circumferential step defines the radially outer edge of said bearing pads.

11. The bearing of claim 9 wherein said circumferential step has a first height $h_1$ at a leading edge of said bearing pads and a second height $h_2$ at a trailing edge of said bearing pads and said second height is greater than said first height.

12. The bearing of claim 9 wherein said first height $h_1$ is in the range of from 0.002 cm to 0.025 cm and said second height $h_2$ is equal to the quantity $h_1$ plus from 0.001 cm to 0.01 cm.

13. The bearing of claim 12 wherein said first height $h_1$ is approximately 0.006 cm and said second height $h_2$ is approximately 0.01 cm.

14. The bearing of claim 9 wherein said plurality of tabs extend radially from about 1 percent to 30 percent of the radius of said disk.

15. The bearing of claim 14 wherein said plurality of tabs extend radially by approximately 5 percent of the radius of said disk.

16. The bearing of claim 9 wherein said thrust bearing disk further includes an inner edge displaced from said major bearing surface to define a second inner circumferential step at the radially inward edge of said bearing pads.

17. A fluid bearing comprising:
a pair of members arranged for relative rotation with respect to one another, one of said pair of members adapted to rotatably support the other; and
a compliant foil bearing including a compliant foil thrust bearing disk operably disposed between said pair of relatively rotatable members, said foil thrust bearing disk having a plurality of integral bearing pads separated by a plurality of generally radially extending slots, and a plurality of tabs extending from the outer circumference of said foil thrust bearing disk aligned radially outward from said plurality of slots to locally increase the flexural rigidity of said thrust bearing disk.

18. The bearing of claim 17 wherein said plurality of tabs extend radially from about 1 percent to 30 percent of the radius of said disk.

19. The bearing of claim 18 wherein said plurality of tabs extend radially by approximately 5 percent of the radius of said disk.

20. A compliant foil thrust bearing disk for a compliant foil thrust bearing adapted to support relatively rotatably members, said disk comprising:
a disk of metal foil having a plurality of generally radially extending slots to define therebetween radially inwardly converging integral bearing pads forming a major bearing surface; and
means for increasing the flexural rigidity of said disk, said means for increasing the flexural rigidity of said disk including a circumferential step formed by displacing the outer edge of said disk from said major bearing surface, said circumferential step defining the outer edge of said bearing pads, said circumferential step having a first height $h_1$ at a leading edge of said bearing pads and a second height $h_2$ at a trailing edge of said bearing pads and said second height is greater than said first height in that, and said first height $h_1$ is in the range of from 0.0002 cm to 0.025 cm and said second height $h_2$ is equal to the quantity $h_1$ plus from 0.001 to 0.01 cm.

21. The compliant foil thrust bearing disk of claim 20 wherein said thrust bearing disk further includes an inner edge displaced from said major bearing surface to define a second inner circumferential step at the radially inward edge of said bearing pads.

22. A complaint foil thrust bearing disk for a complaint foil thrust bearing adapted to support relatively rotatable members, said disk comprising:
a disk of metal foil having a plurality of generally radially extending slots to define therebetween radially inwardly converging integral bearing pads forming a major bearing surface; and
means for increasing the flexural rigidity of said disk, said means for increasing the flexural rigidity of said disk including a plurality of tabs extending from the outer circumference of said disk and aligned radially outward from said plurality of slots wherein said plurality of tabs extend radially from about 1 percent to 30 percent of the radius of said disk.

23. A compliant foil thrust bearing disk for a complaint foil thrust bearing adapted to support relatively rotatable members, said disk comprising:
a disk of metal foil having a plurality of generally radially extending slots to define therebetween radially inwardly converging integral bearing pads forming a major bearing surface; and
means for increasing the flexural rigidity of said disk, said means for increasing the flexural rigidity of said disk including a circumferential step formed by displacing the outer edge of said disk from said major bearing surface, said circumferential step defining the outer edge of said bearing pads wherein said plurality of slots extend into said circumferential step and said circumferential step defines the radially outer edge of said bearing pads.

* * * * *